(12) United States Patent
Fussell et al.

(10) Patent No.: US 7,742,854 B2
(45) Date of Patent: Jun. 22, 2010

(54) SYSTEM AND METHOD FOR RESPONDING TO GROUND AND FLIGHT SYSTEM MALFUNCTIONS

(75) Inventors: Ronald M. Fussell, Altamonte Springs, FL (US); Julie J. Anderson, Merritt Island, FL (US)

(73) Assignee: Boeing Management Company, Irvine, CA (US)

( * ) Notice: Subject to any disclaimer, the term of this patent is extended or adjusted under 35 U.S.C. 154(b) by 859 days.

(21) Appl. No.: 11/550,231

(22) Filed: Oct. 17, 2006

(65) Prior Publication Data

US 2008/0091310 A1 Apr. 17, 2008

(51) Int. Cl.
*G06F 7/00* (2006.01)
(52) U.S. Cl. .............................. 701/29; 701/33; 706/913
(58) Field of Classification Search .................... None
See application file for complete search history.

(56) References Cited

U.S. PATENT DOCUMENTS

| | | | | |
|---|---|---|---|---|
| 4,985,857 A | * | 1/1991 | Bajpai et al. ................. 702/184 |
| 5,127,005 A | * | 6/1992 | Oda et al. ...................... 714/26 |
| 5,195,029 A | * | 3/1993 | Murai et al. ................... 700/79 |
| 5,408,412 A | * | 4/1995 | Hogg et al. .................... 701/33 |
| 5,602,733 A | * | 2/1997 | Rogers et al. ................. 701/29 |
| 6,122,575 A | * | 9/2000 | Schmidt et al. ............... 701/29 |
| 2004/0199542 A1 | * | 10/2004 | Morgan et al. ........... 707/104.1 |

OTHER PUBLICATIONS

Jaw et al.; Anomaly detection and reasoning with embedded physical model; Aerospace Conf. Proceedings, 2002; IEEE; vol. 6, pp. 3073-3081.*

* cited by examiner

*Primary Examiner*—Michael J. Zanelli
(74) *Attorney, Agent, or Firm*—Weiss & Moy, P.C.

(57) ABSTRACT

A system for on-board anomaly resolution for a vehicle has a data repository. The data repository stores data related to different systems, subsystems, and components of the vehicle. The data stored is encoded in a tree-based structure. A query engine is coupled to the data repository. The query engine provides a user and automated interface and provides contextual query to the data repository. An inference engine is coupled to the query engine. The inference engine compares current anomaly data to contextual data stored in the data repository using inference rules. The inference engine generates a potential solution to the current anomaly by referencing the data stored in the data repository.

18 Claims, 4 Drawing Sheets

SYSTEM AND METHOD FOR RESPONDING TO GROUND AND FLIGHT SYSTEM MALFUNCTIONS

The invention described herein was made in the performance of work under NASA Contract No. NAS10-02007 and is subject to the provisions of Section 305 of the National Aeronautics and Space Act of 1958 (72 Stat.435: 42 U.S.C.2457).

BACKGROUND OF THE INVENTION

1. Field of the Invention

This invention relates generally to aircraft and spacecraft avionic systems and, more specifically, to a system and method for responding to ground and flight system malfunctions by semantic anomaly resolution.

2. Background of the Invention

Most aircraft such as airplanes, space craft and the like have avionics systems which are designed and built from one or more subsystems. The subsystems are interconnected by signal carrying buses, connected to power sources, etc. Avionic subsystems were at one time relatively simple and tended to function somewhat independently of other subsystems. System operational characteristics and behavior in the event of equipment failures could be analyzed by a few engineers using available analytical and test tools. With the advent of digital avionics, subsystems have become more complex, more integrated with, and more inter-dependent upon one another.

One of the complex and challenging tasks facing modern avionics is that of defining all significant effects on the avionics system of one or more equipment failures. A comprehensive analysis requires the consideration of multiple avionics system operating configurations.

Presently, when an onboard anomaly occurs, a team of engineers are called to review past test data, documentation and the like. Different software simulations and/or hardware test systems may be preformed in order to help the engineers come to a collective consensus in order to provide a resolution or steps for a resolution to correct the anomaly. This process is very complicated and time consuming. The present system and methods only provide for a manual response to the encountered anomaly and there is a distinct lag time between the occurrence of the anomaly and any data/procedure for the resolution of the anomaly.

Therefore, a need exists for a system and method that overcomes the problems associated with the prior art. The system and method will provide an integrated approach to responding to ground and flight system malfunctions.

SUMMARY OF THE INVENTION

A system for on-board anomaly resolution for a vehicle has a data repository. The data repository stores data related to different systems, subsystems, and components of the vehicle. The data stored in the data repository is encoded in a tree-based structure. A query engine is coupled to the data repository. The query engine provides a user and automated interface for the system and provides contextual query to the data repository. An inference engine is coupled to the query engine. The inference engine compares current anomaly data to data stored in the data repository using inference rules. The inference engine generates a potential solution to the current anomaly by referencing the data stored in the data repository.

A method for semantic anomaly resolution of a vehicle system comprising: storing data related to the vehicle into a data repository wherein the data is encoded in a tree-based structure; entering a query regarding the vehicle; and comparing data of the query to contextual data stored in the data repository using inference rules and generating a potential solution to the query by referencing the data stored in the data repository.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
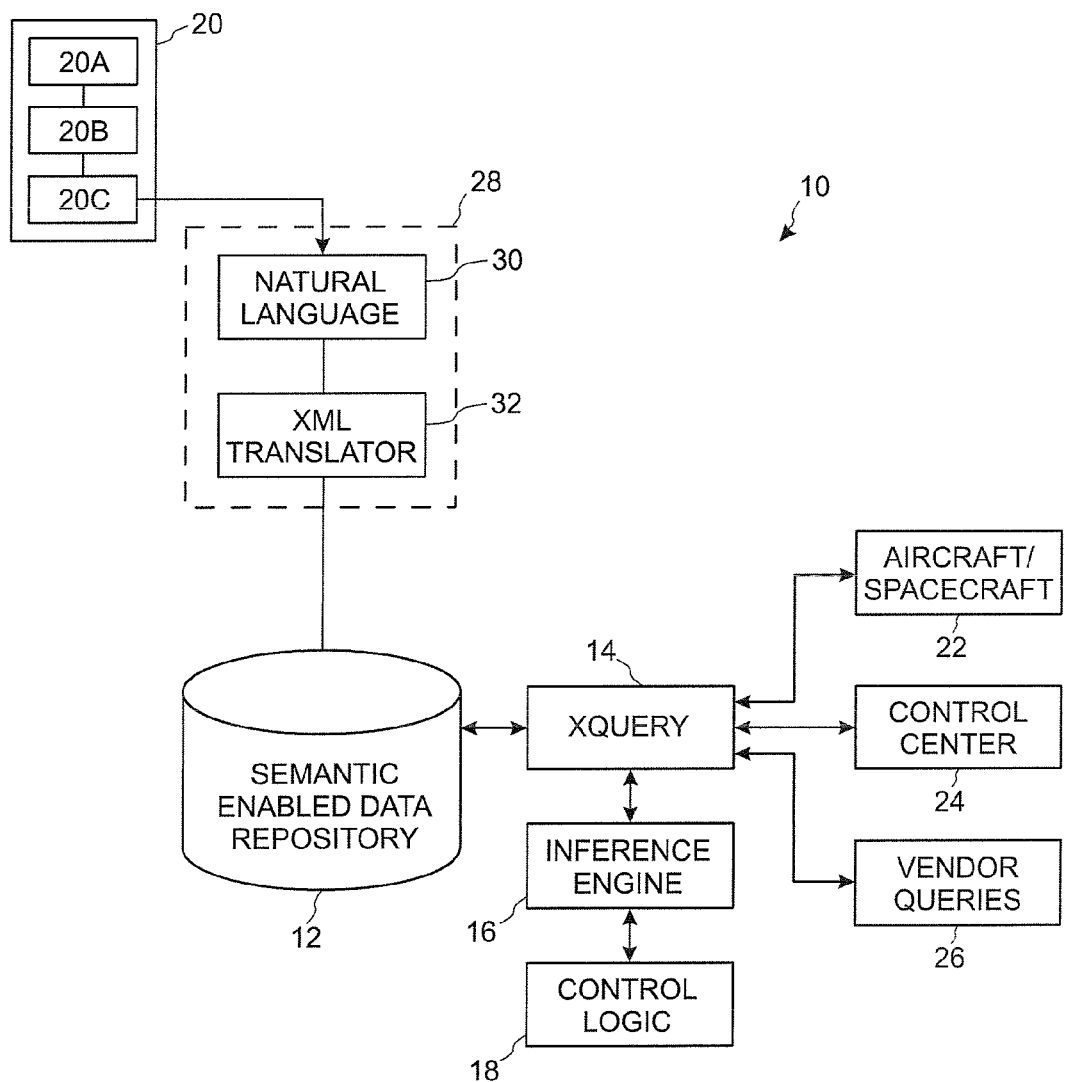
FIG. 1 is a simplified block diagram of the system of the present invention.

Referring to FIG. 1, a system 10 for on-board anomaly resolution for spacecraft/aircraft systems is shown. The system 10 includes a semantic enabled data repository 12, an XQuery engine 14, an inference engine 16, control logic 18, a test documentation unit 20, and translation unit 28. For ease of description, the system 10 will be described in terms of an aircraft avionic system. However, it is to be understood that the system 10 is also suitable for use with other electronic systems that exhibit certain operating characteristics related to subsystem connectivity, system mode, external operating conditions, and temporal constraints on operation.

The semantic enabled data repository 12 is an expert system which uses natural language contexts for data sets. An expert system is a computer program that contains a set of rules that analyze information about a specific class of problems/anomalies, as well as providing analysis of the problems/anomalies. The set of rules stored in the semantic enabled data repository 12 and provide guidance for interfacing are generally called a rulebase and is made up of a plurality of inference rules. Because each rule is a unit, rules may be deleted or added without affecting other rules. Inference rules are a scheme for constructing valid inferences. These schemes establish syntactic relations between a set of formulas called premises and an assertion called a conclusion. These syntactic relations are used in the process of inference, whereby new true assertions are arrived at from other already known ones. After data is run through the rulebase, a course of action is generated that is a potential solution to the current anomaly/problem being experienced by the aircraft.

The semantic enabled data repository 12 will store encoded data related to the avionic system, subsystem, components, and the like of different aircraft. The data stored in the semantic enabled data repository 12 may include, but is not limited to, software simulation data; hardware test system data; data related to previous anomalies experienced by different aircraft; and the like. The listing of the above is given as examples. Other types of data related to the avionic system, subsystem, component and the like may be encoded and loaded into the semantic enabled data repository 12 without departing from the spirit and scope of the present invention.

The semantic enabled data repository 12 is coupled to an XQuery engine 14. The XQuery engine 14 is an interface that allows a person or system (i.e., aircraft, spacecraft, etc.) to present questions and information to the system 10 and supply a response generated by the system 10. When an aircraft experiences a particular system anomaly, a query is entered into the XQuery engine 12 as data related to the system anomaly. The query is generated by the aircraft/spacecraft computer or sensor array. The XQuery engine 12 will take the anomaly data entered and label them as keywords, symbols, operands, contexts, and/or other parameters.

The system anomaly data entered by the query in the XQuery engine 12 is received and interpreted by the interface engine 16. The inference engine 16 is a finite state machine with a cycle consisting of three action states: match rules, select rules, and execute rules. In the first state, match rules, the inference engine 16 finds all of the rules that are satisfied by the current contents entered into the XQuery engine 12. The rules that match a certain criteria related to the system anomaly data contexts entered are all candidates for execution. The rules that match are collectively referred to as the conflict set. It should be noted that the same rule may appear several times in the conflict set if it matches different subsets of data items.

The inference engine 16 then passes along the conflict set to the second state, select rules. In this state, the inference engine 16 applies some selection strategy to determine which rules will actually be executed. The selection strategy can be hard-coded into the inference engine 16, dynamically adjusted by external input (i.e., model generated, user input or mission profile) or may be specified as part of the model.

Finally the selected instantiations are passed over to the third state, execute rules. The inference engine 16 executes or fires the selected rules, with the system anomaly data entered by the spacecraft/aircraft on board computer into the XQuery engine 12 used as the parameters for spacecraft/aircraft anomaly resolution. Since the data that is stored is usually updated by firing rules, a different set of rules will match during the next cycle after these actions are performed.

The inference engine 16 then cycles back to the first state and is ready to start over again. This control mechanism is referred to as the recognize-act cycle. The inference engine 16 stops either on a given number of cycles, controlled by the operator, or on a quiescent state of the data store when no rules match the data. By executing the rules a given number of cycles or when no rules further match the data, the inference engine 16 builds a probability base. The inference engine 16 compares the data to the stored data in the semantic enabled data repository 12 and pulls out potential prior anomalies/data similar to the anomaly currently being experienced. The inference engine 16 will then recommend a course of user action or automated commanding in order to implement corrections.

Control logic 18 is coupled to the inference engine 16. The control logic 18 is used to set the search parameters of the inference engine 16. Thus, the control logic 18 can dictate the rules that will be applied and actually executed, dictate the number of cycles performed during the execution of the rules, and the like. The above is given as an example and should not be seen as to limit the scope of the present invention. The control logic 18 is able to set and define any of the search parameters of the inference engine 16.

Once a recommended course of user action or automated system commanding is generated, this information is transmitted to interested parties. As shown in FIG. 1, the recommended course of action generated may be sent to an automated system or crew of the aircraft 22, command center 24 monitoring the aircraft, vendors 26, and the like. The data may be sent to other parties as well without departing from the spirit and scope of the present invention. In general, all interested parties who are authorized to view the recommended course of action may be sent the data and alerted to the execution of automated steps. The data sent to the interested parties may be shown on display monitors, audible/text messages, and the like. The data is also stored in the data repository 12.

The semantic enabled data repository 12 is coupled to a test documentation unit 20. The test documentation unit 20 is used to encode and load data into the semantic enabled data repository 12. The data that is encoded and loaded will include any documentation related to the avionic system, subsystem, component or the like; software simulation and/or hardware test system data; data related to previous anomalies experienced; and the like. The listing of the above is given as examples. Other types of data related to the avionic system, subsystem, component and the like may be encode and load into the semantic enabled data repository 12 without departing from the spirit and scope of the present invention.

As shown in FIG. 1, the test documentation unit 20 may have multiple units. Thus, the test documentation unit 20 may include data from users of the aircraft 20A (i.e., NASA, air force, airline companies, etc.); different vendors 20B associated with the avionic system, subsystem, component, etc.; data from flight simulators 20C; and the like. The above listing is given as an example and should not be seen as to limit the scope of the present invention. Other sources may be used to supply data to the semantic enabled data repository 12.

All of the data from the different test documentation units 20 will go through a translation unit 28 to allow the data to be more easily stored in the semantic enabled data repository 12. In accordance with the embodiment depicted in FIG. 1, the translation unit 28 has a natural language processing (NLP) unit 30 coupled to the test documentation units 20. The NLP unit 30 will convert data transmitted from the test documentation units 20 into a more formal and contextual representation that is easier to manipulate.

The output of the NLP unit 30 is then sent to a translator 32. The translator 32 will provide a text-based means to describe and apply a tree-based structure to the data. All of the data is manifested as text, interspersed with markup that indicates the information's separation into a hierarchy of character data and contexts, container-like elements, and attributes of those elements. The translator 32 may be an XML translator or the like. The XML translator 32 is basically a tool for XML document conversion from one vocabulary to another. The XML translator 32 is able to automatically create a sort of template from which the different vocabularies can be created, using example documents of each of the different vocabularies.

Figure 2:
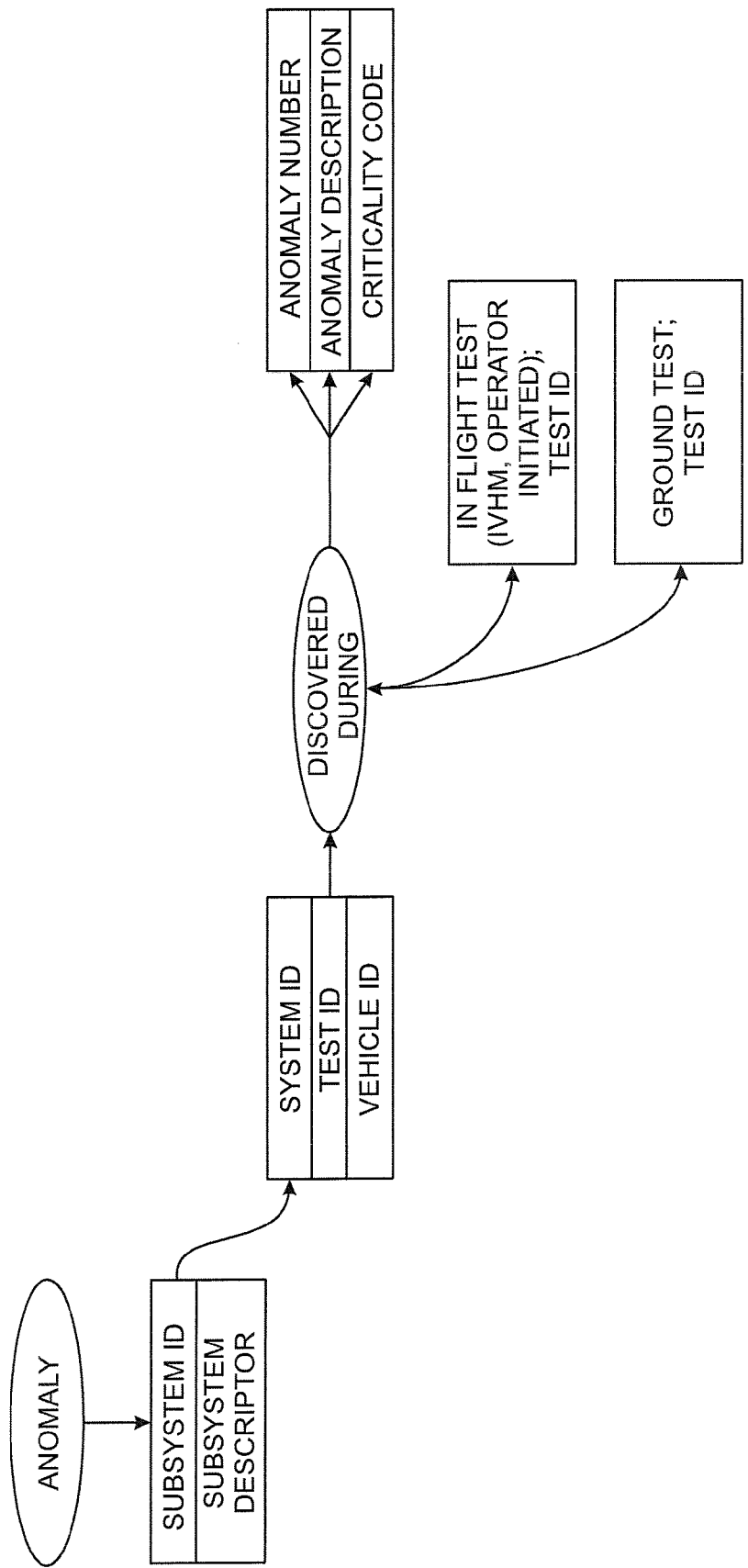
FIG. 2 is a process diagram depicting how data is encoded.
Figure 3:
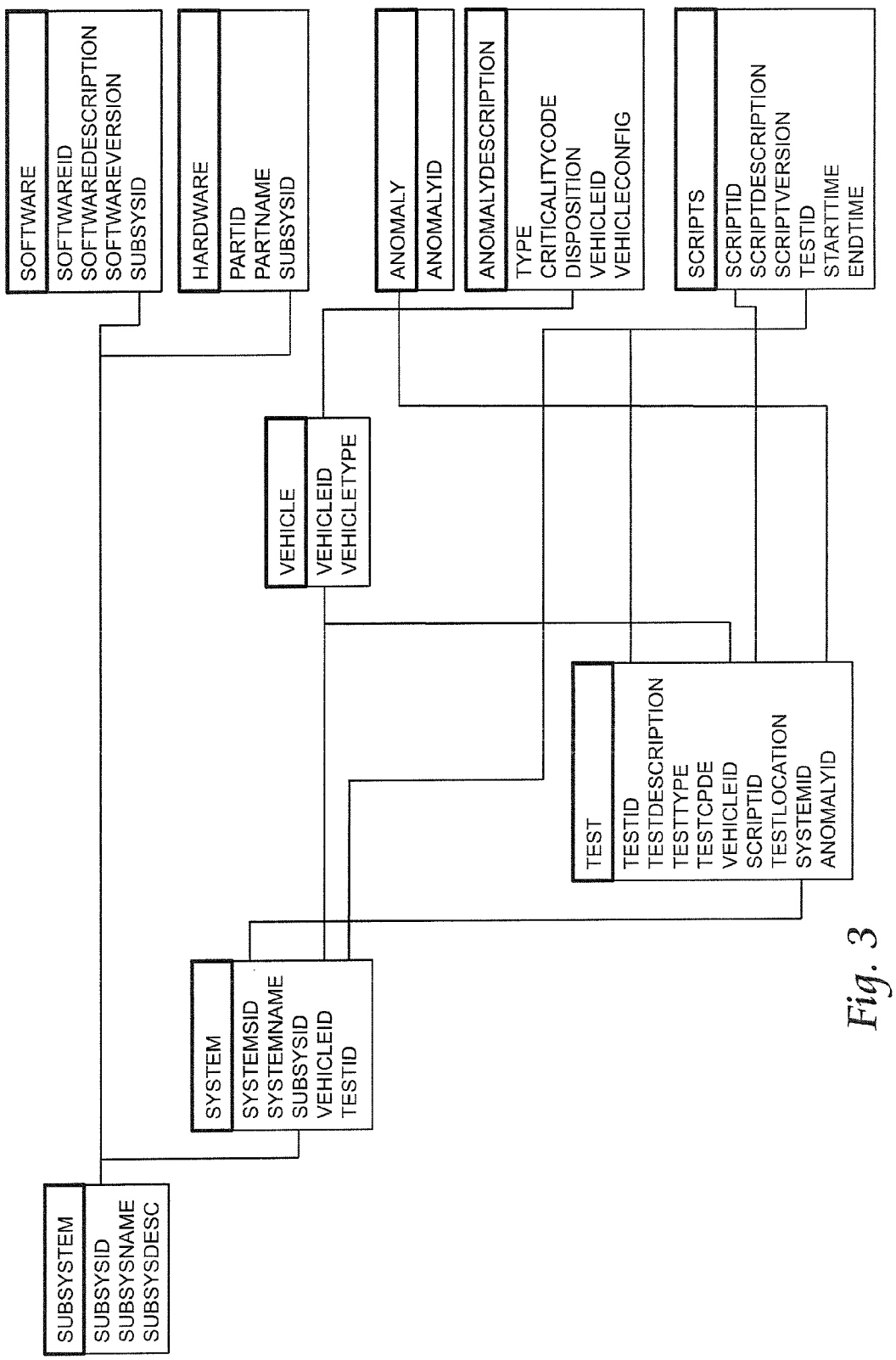
FIG. 3 is a process diagram further detailing how data is encoded.

Referring to FIGS. 2 and 3, all anomalies/data (hereinafter data) stored and processed by the semantic enabled data repository 12 are encoded in the following manner. The data is associated with a specific subsystem. The data is encoded with the sub-system ID, sub-system name and sub-system descriptor. The data is further associated with specific systems affected and a particular vehicle. The data is thus encoded with a system ID, system name, as well as a vehicle ID and vehicle type. If the data is related to a specific test, the data is encoded with a test ID, test description, test type, test code, and test location. The data is further encoded as to whether the data is software or hardware related. If the data is software related, the data is encoded with the software ID, software description, and software version. If the data is hardware related, the data is encoded with part ID and name. If the data is an anomaly, the data is then associated with a time the anomaly was encountered. Thus, the data will be encoded as being associated with in-flight test, ground test, etc. If the data is encountered during flight, the anomaly/data is further encoded with an anomaly number, anomaly description, and critical codes. The critical codes are hardcoded subsystem/system criticality identifiers. When an anomaly is encoded, the anomaly will be encoded with an ID, description, type, criticality code, disposition, vehicle ID and vehicle configuration. It should be noted that the data could be encoded with additional information not listed above. The above is given as an example and should not be seen as to limit the scope of the present invention.

Figure 4:
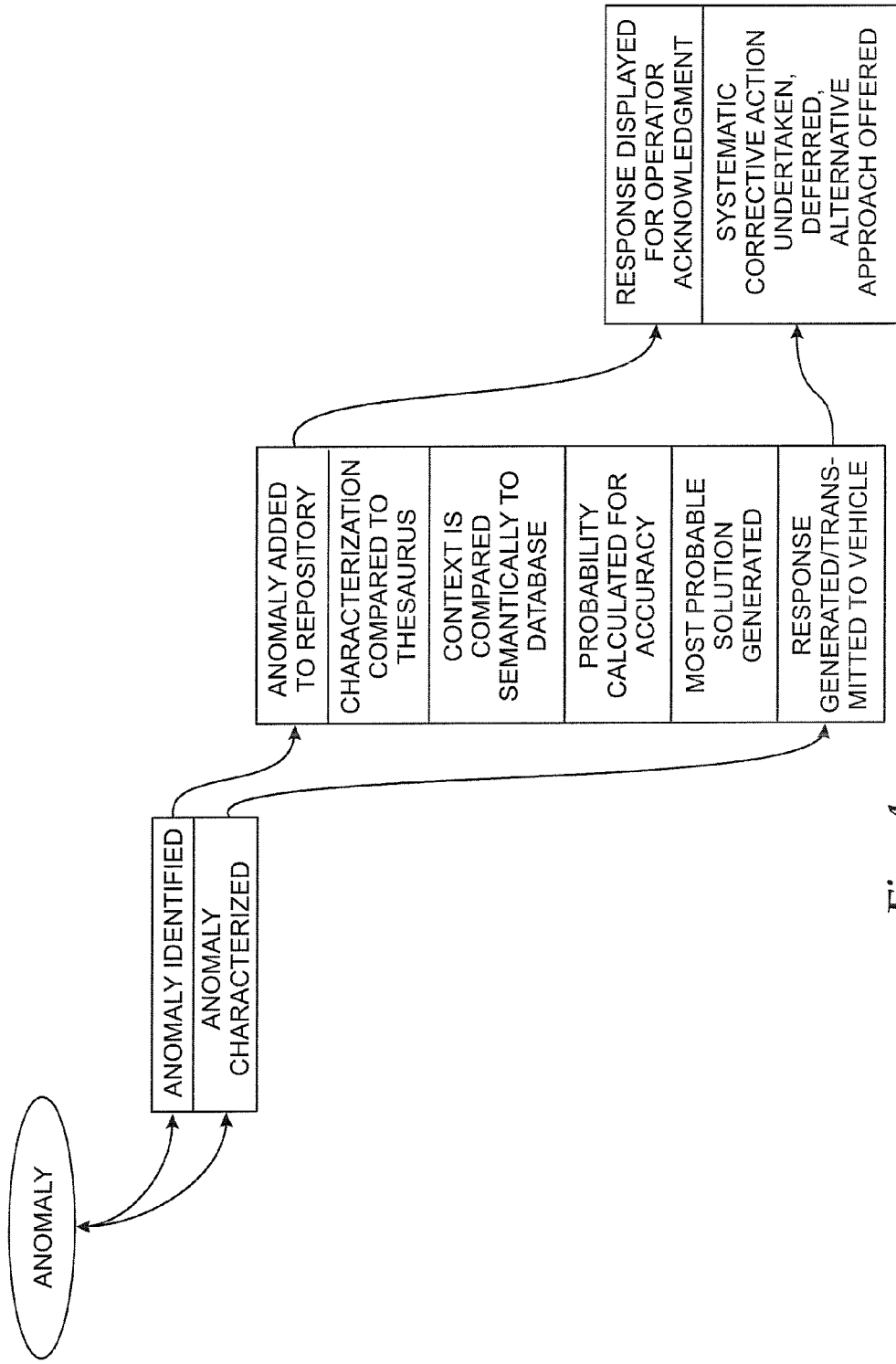
FIG. 4 is a process diagram showing the operation of the system of the present invention.

Referring to FIG. 4, during test operation, when an aircraft experiences an anomaly, the data related to the anomaly is identified and characterized. The anomaly data is encoded by the translation unit 28 and sent to the semantic enabled data repository 12. The XQuery 14 is used to compare the anomaly data to data context stored in the semantic enabled data repository 12. The inference engine 16 executes or fires selected rules, with the data of the anomaly used as the parameters. The inference engine 16 will stop either on a given number of cycles, controlled by the operator or dynamic input from external sources, or on a quiescent state of the data store when no rules match the data. By executing the rules a given number of cycles or when no rules further match the data, the inference engine 16 build a probability base. The inference engine 16 compares the query data to the stored contextual data in the semantic enabled data repository 12 and pulls out potential prior anomalies/data similar to the anomaly currently being experienced based upon Xquery thesaurus contextual datasets. The inference engine 16 will then recommend a course of user action or transmit corrective action commands in order to implement corrections. The recommended course of action or execution notification is then sent to the interested parties.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A system for on-board anomaly resolution for a vehicle comprising:
   a data repository for storing data related to different systems, subsystems, and components of the vehicle, wherein the data is encoded in a treebased structure, wherein the data repository is an expert system, the expert system storing a rulebase, wherein the data is run through the rulebase and a potential course of action is generated;
   a query engine coupled to the data repository for providing a user and automated interface to provide contextual query to the data repository; and
   an inference engine coupled to the query engine for comparing current anomaly data to the data stored in the data repository using inference rules, the inference engine cycles through the inference rules generating a potential solution to the current anomaly by referencing the data stored in the data repository.

2. A system for on-board anomaly resolution for a vehicle in accordance with claim 1 further comprising a documentation unit coupled to the data repository to load data into the data repository.

3. A system for on-board anomaly resolution for a vehicle in accordance with claim 2 further comprising a translation unit coupled to the documentation unit and the data repository to convert data for storage in the data repository.

4. A system for onboard anomaly resolution for a vehicle in accordance with claim 3 wherein the translation unit comprises:
   a natural language processing (NLP) unit coupled to the documentation unit; and
   a translator coupled to the NLP unit to provide a text based way to describe and apply a tree-based structure to the data.

5. A system for on-board anomaly resolution for a vehicle in accordance with claim 1 further comprising a communication device coupled to the query engine to communicate the potential solution to the current anomaly generated by the inference engine.

6. A system for on-board anomaly resolution for a vehicle in accordance with claim 5 wherein the communication device is one of a display mechanism and an automated control device located in an aircraft.

7. A system for on-board anomaly resolution for a vehicle in accordance with claim 5 wherein the communication device is located in at least one of an aircraft, command center, and vendor.

8. A system for on-board anomaly resolution for a vehicle in accordance with claim 1 wherein the inference engine comprises:
   a match rules unit that locates all rules that are satisfied by the current date entered into the query engine;
   a select rules unit coupled to the match rules unit that applies a selection strategy to determine which rules will be executed; and
   an execute rules unit coupled to the select rules unit that executes the selected rules.

9. A system for on-board anomaly resolution for a vehicle in accordance with claim 1 further comprising control logic coupled to the inference engine to set search parameters of the inference engine.

10. A system for onboard anomaly resolution for a vehicle comprising:
   a data repository for storing data related to different systems, subsystems, and components of the vehicle, wherein the data repository is an expert system, the expert system storing a rulebase, wherein the data is run through the rulebase and a potential course of action is generated;
   a query engine coupled to the data repository for providing a contextual query interface;
   an inference engine coupled to the query engine for comparing current anomaly data to data stored in the data repository, the inference engine cycles through inference rules generating a potential solution to the current anomaly by referencing the data stored in the data repository;
   control logic coupled the inference engine to set search parameters of the inference engine;
   documentation unit coupled to the data repository to load data into the data repository related to the different systems, subsystems, and components of the vehicle; and
   a translation unit coupled to the documentation unit and the data repository to encode data from the documentation unit for storage in the data repository.

11. A system for on-board anomaly resolution for a vehicle in accordance with claim 10 wherein the translation unit comprises:
- a natural language processing (NLP) unit coupled to the documentation unit; and
- a translator coupled to the NLP unit to provide a text based way to describe and apply a tree-based structure to the data.

12. A system for on-board anomaly resolution for a vehicle in accordance with claim 10 further comprising a communication device coupled to the query engine to communicate the potential solution to the current anomaly generated by the inference engine.

13. A system for on-board anomaly resolution for a vehicle in accordance with claim 10 wherein the inference engine comprises:
- a match rules unit that locates all rules that are satisfied by the current data entered into the query engine;
- a select rules unit coupled to the match rules unit that applies a selection strategy to determine which rules will be executed; and
- an execute rules unit coupled to the select rules unit that executes the selected rules.

14. A method for generating a potential solution of an onboard anomaly of a system of a vehicle comprising:
- storing data related to the vehicle into a data repository wherein the data is encoded in a tree-based structure, wherein the data repository is an expert system, the expert system storing a rulebase, wherein the data is run through the rulebase and a potential course of action is generated;
- entering a query regarding the vehicle; and
- comparing data of the query to contextual data stored in the data repository and generating the potential solution to the query by referencing the data stored in the data repository.

15. The method of claim 14 wherein comparing the data further comprises:
- locating a set of inference rules for constructing valid inferences that is satisfied by the data of the query;
- determining which inference rules in the set of inference rules will be executed; and
- executing the selected inference rules for constructing valid inferences to generating a potential solution to the query.

16. The method of claim 14 further comprising:
- collecting data related to the vehicle from different sources; and
- translating the collected data before loading into the data repository.

17. The method of claim 15 further comprising setting parameters for the location, determination and execution of the inference rules.

18. The method of claim 14 further comprising communicating the potential solution generated.

* * * * *